Feb. 13, 1934.     A. SISCO     1,946,641
SPINNER
Filed March 14, 1932
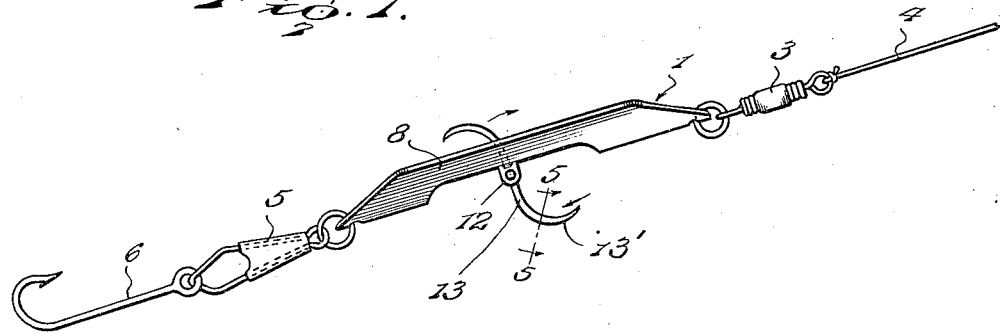
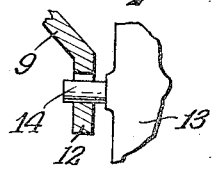
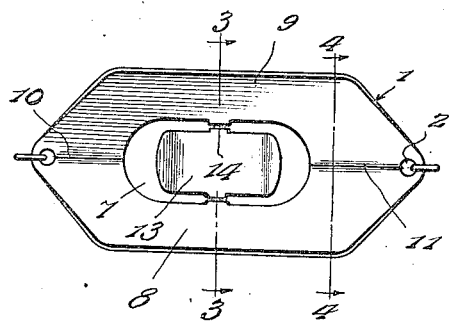
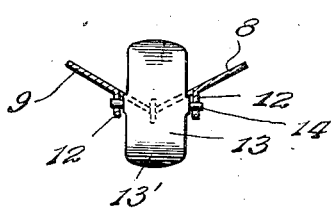
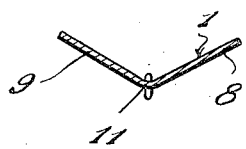
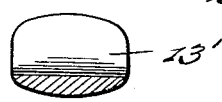
Inventor
Alexander Sisco.
By Lacey & Lacey,
Attorneys Patented Feb. 13, 1934

1,946,641

UNITED STATES PATENT OFFICE 1,946,641

SPINNER

Alexander Sisco, Lorain, Ohio

Application March 14, 1932. Serial No. 598,743

3 Claims. (Cl. 43—45)

This invention relates to an improved spinner lure for use in conjunction with fishing lines.

One object of the invention is to provide a spinner lure which may be used for either casting or trolling and which will remain upon the surface when in motion.

Another object of the invention is to provide a device of this character where in the spinner employed will be caused to rotate when above and below the surface of the water so that fish will be attracted by said spinner.

A further object of the invention is to provide a spinner lure which will be characterized by the utmost simplicity and which may be manufactured cheaply.

A still further object of the invention is to provide a spinner lure wherein the spinner will be mounted more or less loosely in the spoon or body so that the rotation of the spinner will not only chop up the surface of the water but will also cause a chattering noise which will tend to attract fish.

Other and incidental objects of the invention not mentioned in the foregoing will be apparent during the course of the following description.

In the drawing:

Figure 1 is a side elevation of the device.

Figure 2 is a top plan view of the device.

Figure 3 is a transverse sectional view of the device on the line 3—3 of Figure 2 looking in the direction indicated by the arrows.

Figure 4 is a transverse sectional view on the line 4—4 of Figure 2 looking in the direction indicated by the arrows.

Figure 5 is an enlarged fragmentary sectional view on the line 5—5 of Figure 1 looking in the direction indicated by the arrows, and Figure 6 is an enlarged fragmentary sectional view showing one of the trunnions 14 loosely journaled in the bearing 12.

Referring now more particularly to the drawing the numeral 1 indicates a spoon or body which is preferably formed of a lightweight metal and is oblong in shape and obtuse angular in cross section. As best seen in Figure 2 of the drawing, the opposite ends of the spoon are provided with converging edges which meet substantially intermediate the width of said spoon. Formed in the ends of the spoon are openings 2 which are adapted to receive connecting devices for use in conjunction with a fishing line.

The numeral 3 indicates a swivel which is connected to one end of the spoon, and connected to the opposite end of said swivel is a fishing line, a portion of which is indicated by the numeral 4. Connected to the opposite end of the spoon is a line engaging fastener 5. I have shown in Figure 1, a hook 6 as being connected to the line fastener 5, but it is to be understood that an additional fish luring device may be connected with the spoon and may be disposed to follow any desired distance in the rear of said spoon. The central portion of the spoon is cut away to define a relatively wide slot 7, the end edges of said slot being rounded and said slot having straight parallel side edges. The slot defines relatively narrow side portions 8 and 9 for the spoon and relatively wide end portions 10 and 11. Formed on the spoon 1 and projecting upwardly from the side edges of the slot 7 are oppositely disposed aligned bearings 12.

Associated with the spoon and rotatably mounted in the slot 7 is a substantially S-shaped spinner 13 having trunnions 14 which are journaled in the bearings 12. It will be seen that the spinner is provided with end portions 13'. It will be seen from a study of Figure 6 of the drawing that the trunnions are to be more or less loosely mounted in the bearings so that the spinner will be not only freely rotatable in said bearings, but which will also permit chattering of the trunnions within the bearings so that a slight noise will be made by the rotating of said spinner. This noise will have a tendency to attract fish to the line.

As best seen in Figure 5 of the drawing, the opposite end portions 13' of the spinner are thickened and are arcuate in cross section. This construction will facilitate the ready rotation of the spinner when above and beneath the water.

Attention is directed to the fact that, as the spoon is of an obtuse angular shape in cross section, it will be permitted to ride along, just under, or upon the surface of the water when in motion. In this manner the device will also always have a life like appearance so that a fish, seeing said device, will be lured to the line.

It is, of course, to be understood, that the device may be used for either casting or trolling and it is, of course, to be understood that the spinner may be shaped or ornamented to present the appearance of diving or jumping minnows or the like.

In use, the line is first connected to the swivel 3 at one end of the spoon and an additional lure or hook is connected to the opposite end of the spoon. As heretofore stated, the additional lure may be disposed to follow any given distance behind the spoon. The hook is then baited and the device cast. The line may be shifted and caused to move through the water, which will, of course, cause the spoon to ride along upon the surface, or just beneath the surface thereof. The movement of the spoon through the water will cause the spinner to rotate and will cause the surface of the water to be chopped up so that it would appear that a minnow or other small fish is swimming around. The noise caused by the chattering of the rotating spinner and the disturbing of the surface of the water by said spinner will tend to lure fish to the hook.

It will be seen that I have provided a simple and highly efficient spinner lure which may be manufactured cheaply.

Having thus described the invention, I claim:

1. A spinner lure including a spoon angular in cross section provided with a slot and having bearings disposed adjacent to the slot, and a spinner carried by the spoon and rotatable in the slot, said spinner having trunnions journaled in the bearings and being adapted to rotate as the spoon is shifted in the water.

2. A spinner lure including a spoon having a slot defining relatively narrow side portions and relatively wide end portions, bearings formed on the edges of said side portions defining the slot, a spinner rotatable in the slot and having trunnions loosely mounted in the bearings whereby a chattering noise will be effected by the rotating of the spinner.

3. A spinner lure including a spoon obtuse angular in cross section and provided with a slot, bearings carried by the spoon, and a spinner rotatable in the slot and having trunnions journaled by the bearings, said obtuse angular spoon providing means whereby the device will float along the surface of the water in motion.

ALEXANDER SISCO. [L. S.]